(12) United States Patent
Hoekstra

(10) Patent No.: US 11,714,230 B2
(45) Date of Patent: Aug. 1, 2023

(54) ENVIRONMENTALLY PROTECTED PHOTONIC INTEGRATED CIRCUIT

(71) Applicant: EFFECT PHOTONICS B.V., Eindhoven (NL)

(72) Inventor: Tsjerk Hans Hoekstra, Eindhoven (NL)

(73) Assignee: EFFECT PHOTONICS B.V., Eindhoven (NL)

( * ) Notice: Subject to any disclaimer, the term of this patent is extended or adjusted under 35 U.S.C. 154(b) by 0 days.

(21) Appl. No.: 17/541,345

(22) Filed: Dec. 3, 2021

(65) Prior Publication Data

US 2022/0196910 A1 Jun. 23, 2022

(30) Foreign Application Priority Data

Dec. 23, 2020 (EP) .................................... 20216854

(51) Int. Cl.
G02B 6/12 (2006.01)
(52) U.S. Cl.
CPC ............. *G02B 6/12002* (2013.01); *G02B 2006/12061* (2013.01); *G02B 2006/12076* (2013.01)
(58) Field of Classification Search
CPC .................................................. G02B 6/12002
See application file for complete search history.

(56) References Cited

U.S. PATENT DOCUMENTS

| | | | | |
|---|---|---|---|---|
| 6,052,397 A * | 4/2000 | Jeon | ........................ | H01S 5/10 372/46.01 |
| 9,703,047 B2 | 7/2017 | Painchaud et al. | | |
| 2002/0018636 A1 * | 2/2002 | Bischel | .................... | H04J 14/02 385/140 |
| 2002/0141682 A1 * | 10/2002 | Ryu | ...................... | G02B 6/1228 385/14 |
| 2003/0223672 A1 | 12/2003 | Joyner et al. | | |

(Continued)

FOREIGN PATENT DOCUMENTS

| | | |
|---|---|---|
| CN | 108885305 A | 11/2018 |
| CN | 110446972 A | 11/2019 |

(Continued)

OTHER PUBLICATIONS

Taiwanese Search Report dated Oct. 6, 2022 for family member application EP20216854.8.

(Continued)

*Primary Examiner* — Charlie Y Peng
(74) *Attorney, Agent, or Firm* — Hudak, Shunk & Farine Co. LPA

(57) ABSTRACT

An environmentally protected PIC, including an InP-based substrate having a first surface that is at least partially provided with an InP-based optical waveguide, and a dielectric protective layer arranged to cover at least the first surface of the InP-based substrate and the InP-based optical waveguide. The dielectric protective layer is configured to protect said PIC from environmental contaminants, to enable confinement of optical radiation in the dielectric protective layer in at least one direction that is transverse to a direction of propagation of the optical radiation, and to allow exchange of the optical radiation between the InP-based optical waveguide and the dielectric protective layer. An opto-electronic system including PIC.

15 Claims, 9 Drawing Sheets

(56) References Cited

U.S. PATENT DOCUMENTS

| | | |
|---|---|---|
| 2010/0247037 A1 | 9/2010 | Little |
| 2011/0305255 A1* | 12/2011 | Ishimura ................ H01S 5/12 372/50.1 |
| 2013/0251948 A1 | 9/2013 | Lyons et al. |
| 2019/0013640 A1* | 1/2019 | Cheung ................ H01S 5/4062 |
| 2019/0079243 A1* | 3/2019 | Lebby ................ G02B 6/1228 |
| 2019/0204506 A1 | 7/2019 | Becker et al. |

FOREIGN PATENT DOCUMENTS

| | | |
|---|---|---|
| CN | 110537143 A | 12/2019 |
| JP | 5-43611 A | 2/1993 |
| JP | 2000321452 A | 11/2000 |
| JP | 2001127378 A | 5/2001 |
| JP | 2003-513328 A | 4/2003 |
| JP | 3684112 B2 | 8/2005 |
| JP | 2010-266541 A | 11/2010 |
| JP | 2015002335 A * | 1/2015 |
| JP | 2017-514167 A | 6/2017 |
| KR | 10-2011-0050167 A | 5/2011 |
| TW | 201530206 A | 8/2015 |

OTHER PUBLICATIONS

English translation of the Taiwanese Search Report dated Sep. 11, 2022 for family member application 110142986.
Corresponding Japanese application office action dated Apr. 4, 2023.

* cited by examiner

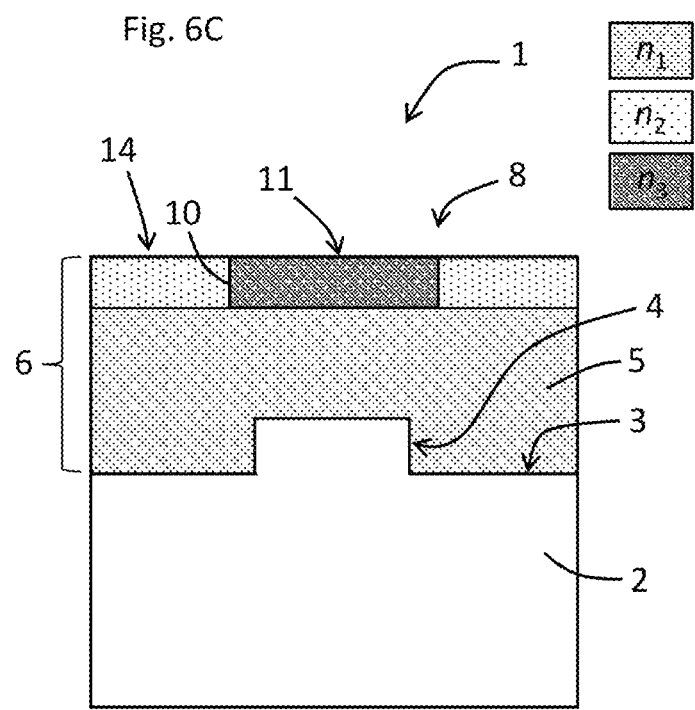

ENVIRONMENTALLY PROTECTED PHOTONIC INTEGRATED CIRCUIT

FIELD OF THE INVENTION

The present invention relates to an environmentally protected photonic integrated circuit that can be used for example but not exclusively for telecommunication applications or sensor applications. The invention further relates to an opto-electronic system, which can be used for example but not exclusively for telecommunication applications or sensor applications, wherein the opto-electronic system comprises said photonic integrated circuit.

BACKGROUND OF THE INVENTION

Photonic integrated circuits (PICs), for example but not exclusively in the field of optical telecommunication applications, are becoming increasingly complex because of the increasing number of optical and electrical functions that are integrated on a single die that preferably has a footprint that is as small as possible. The most versatile technology platform for PICs for optical telecommunication applications uses wafers comprising indium phosphide-based (InP) semiconductor materials. InP-based technology enables monolithic integration of both active components such as for example light-generating and/or light-absorbing optical devices, and passive components such as for example light-guiding and/or light-switching optical devices, in one PIC on a single die.

Conventionally, environmental protection of PICs and the opto-electronic systems including them such as for example optical transceiver modules, is provided by hermetic packaging. As a result of the above-mentioned increasing complexity, the costs for assembly and in particular hermetic packaging are a significant part of the total costs of the PICs and the opto-electronic systems in which they are used.

An alternative for hermetic packaging that enables reduced assembly and packaging costs is provided by applying at least one dielectric protective layer to a PIC to thereby protect it from environmental contaminants such as dust particles and/or moisture.

SUMMARY OF THE INVENTION

It is an insight of the present invention that in addition to providing protection against environmental contaminants, the at least one dielectric protective layer can be configured to provide additional optical functionality to the PIC. Therefore, it is an object of the present invention to provide an environmentally protected photonic integrated circuit (PIC) that can be used for example but not exclusively for telecommunication applications or sensor applications. The PIC comprising at least one dielectric protective layer that not only protects the PIC against environmental contaminants but also provides additional optical functionality.

It is also an object of the present invention to provide an opto-electronic system, which can be used for example but not exclusively for telecommunication applications or sensor applications, wherein the opto-electronic system comprises a PIC according to the invention.

Aspects of the present invention are set out in the accompanying independent and dependent claims. Features from the dependent claims may be combined with features from the independent claim as appropriate and not merely as explicitly set out in the claims. Furthermore, all features may be replaced with other technically equivalent features.

At least one of the abovementioned objects is achieved by an environmentally protected photonic integrated circuit, comprising:
an indium phosphide, InP-based substrate having a first surface that is at least partially provided with an InP-based optical waveguide; and
a dielectric protective layer that is arranged to cover at least the first surface of the InP-based substrate and the InP-based optical waveguide, the dielectric protective layer being configured to:
protect said photonic integrated circuit from environmental contaminants;
enable confinement of optical radiation in the dielectric protective layer in at least one direction that is transverse to a direction of propagation of the optical radiation; and
allow exchange of the optical radiation between the InP-based optical waveguide and the dielectric protective layer;
wherein the InP-based optical waveguide and the dielectric protective layer provide said photonic integrated circuit with a multilevel optical waveguide assembly.

In this way, the dielectric protective layer provides both environmental protection of the PIC against environmental contaminants such as for example dust particles and moisture, and additional optical functionality as optical radiation that is carried by the dielectric protective layer of the multilevel optical waveguide assembly can be used for example for at least one of monitoring and testing purposes. In addition, the dielectric protective layer can for example enable mode expansion of the optical radiation in the dielectric protective layer in order to provide low-loss optical coupling between the PIC and an optical fiber. Furthermore, as the dielectric protective layer enables using standard optical fibers instead of specialty or lensed optical fibers that are required in accordance with traditional solutions for establishing optical fiber-chip couplings, the complexity and therefore the costs involved with establishing optical couplings between standard optical fibers and the PIC according to the present invention can be lower than the complexity and costs involved with said traditional solutions.

In an exemplary embodiment of the environmentally protected PIC according to the invention, the InP-based optical waveguide and the dielectric protective layer can be in direct contact with each other. However, the person skilled in the art will appreciate that the dielectric protective layer can also be applied to a stack of non-semiconductor layers that are arranged to cover at least the first surface of the InP-based substrate and the InP-based optical waveguide. The stack of non-semiconductor layers can comprise metal layers and dielectric layers such as for example silicon nitride-based layers or polymer-based layers. In the event that the stack of non-semiconductor layers comprises a metal layer, the person skilled in the art will appreciate that the dielectric protective layer can be provided with at least one opening to enable formation of an electrical connection to the metal layer.

The dielectric protective layer can be a polymer-based layer and a non-polymer-based layer such as for example a silicon-containing layer, e.g. silicon nitride or silicon oxynitride.

The dielectric protective layer can have a thickness between 0.5 µm and 100 µm, preferably between 0.5 µm and 10 µm. In this way, the thickness of the dielectric protective layer should be sufficient to limit diffusion of environmental contaminants thereby enabling environmental protection of the PIC.

In another exemplary embodiment of the environmentally protected PIC according to the invention, the PIC is a monolithic PIC.

In a further exemplary embodiment of the environmentally protected PIC according to the invention, the multilevel optical waveguide assembly can comprise multiple dielectric layers each of which provides at least one of an ancillary optical waveguide and a coupling structure in a position other than a coupling face of the PIC. The dielectric layers preferably have different refractive indices.

In an embodiment of the environmentally protected photonic integrated circuit according to the invention, the InP-based optical waveguide has a dimension in a direction transverse to the first surface of the InP-based substrate, said dimension having a first value in a first part of said waveguide and a second value in a second part of said waveguide, the second value being smaller than the first value, said waveguide comprising a tapered section that is configured and arranged to interconnect the first part of said waveguide and the second part of said waveguide thereby allowing an optical mode field of said optical radiation upon passing the tapered section from the first part to the second part to be divided in a first portion that is present in said waveguide and a second portion that is present in the dielectric protective layer. The dimension of the InP-based optical waveguide is generally referred to as the height of the waveguide. The tapered section of the InP-based waveguide provides a transition region in which a first height of the first part of the waveguide is changed to a second height of the second part of the waveguide, wherein the first height is larger than the second height. When the optical radiation travels from the first part of the waveguide to the second part, the mode field of the optical radiation can at least partially be pushed out of the InP-based optical waveguide. A first portion of the optical mode field remains in the InP-based optical waveguide and a second portion of the optical mode field is present in the waveguide of the multilevel optical waveguide assembly provided by the polymer-based protective layer. In an exemplary embodiment of the environmentally protected photonic integrated circuit according to the invention, the second portion of the optical mode field of the optical radiation that is present in the polymer-based protective layer is at least 0.5% of the optical mode field of the optical radiation. In this way, the optical radiation in the optical waveguide of the multilevel optical waveguide assembly that is provided by the polymer-based protective layer is sufficient for at least one of the above-mentioned additional optical functionalities such as for example monitoring and testing purposes.

When the dielectric protective layer has a sufficient thickness, i.e. a thickness between 0.5 µm and 100 µm, preferably between 0.5 µm and 10 µm, the above-mentioned mode expansion for establishing optical fiber-chip coupling can be achieved. The person skilled in the art will appreciate that the tapered section can also be configured to allow optical mode division in a lateral direction of the PIC.

In an embodiment of the environmentally protected photonic integrated circuit according to the invention, the InP-based optical waveguide is a nonplanar optical waveguide. Examples of nonplanar optical waveguides are ridge waveguides, rib waveguides, buried channel waveguides, strip-loaded waveguides and diffused waveguides.

In an embodiment of the environmentally protected photonic integrated circuit according to the invention, the dielectric protective layer is a conformal coating that provides the multilevel optical waveguide assembly with a nonplanar dielectric optical waveguide that is configured to allow confinement of the second portion of the optical mode of the optical radiation in the dielectric protective layer in two orthogonal directions that both are transverse to the direction of propagation of the optical radiation. By applying the dielectric protective layer as a conformal coating, the dielectric protective layer follows the contours of the nonplanar InP-based optical waveguide thereby providing a nonplanar dielectric optical waveguide. The person skilled in the art will appreciate that contrary to planar optical waveguides, nonplanar optical waveguides provide confinement of optical radiation in two orthogonal directions that are both transverse to the direction of propagation of the optical radiation. Furthermore, nonplanar optical waveguides support hybrid modes in addition to transverse electric (TE) and transverse magnetic (TM) modes, whereas planar optical waveguides support only TE and TM modes.

In an embodiment of the environmentally protected photonic integrated circuit according to the invention, the dielectric protective layer is a planarizing coating that provides the multilevel optical waveguide assembly with a planar dielectric optical waveguide. Upon covering the nonplanar InP-based optical waveguide, the dielectric protective layer that is applied as a planarizing coating provides a layer with a plane surface that is arranged to face away from the first surface of the InP-based substrate. Based on the above, it is clear that the planar dielectric optical waveguide of the multilevel optical waveguide assembly provides confinement of optical radiation in only one orthogonal direction transverse to the direction of propagation of the optical radiation. It will be appreciated that in the PIC according to the present invention, the direction in which the optical radiation is confined in the planar dielectric optical waveguide is transverse to the first surface of the InP-based substrate.

It is noted that optical confinement in the planar dielectric protective layer in the other direction transverse to the direction of propagation of the optical radiation, i.e. in the transverse direction that is directed parallel to the first surface of the InP-based substrate, can be achieved by providing suitable regions in the dielectric protective layer with a reduced refractive index.

In an embodiment of the environmentally protected photonic integrated circuit according to the invention, the dielectric protective layer comprises an elongated structure that is arranged to protrude in a direction facing away from the first surface of the InP-based substrate and to extend across at least a part of the dielectric protective layer thereby providing the multilevel optical waveguide assembly with a nonplanar dielectric optical waveguide that is configured to allow confinement of the second portion of the optical mode of the optical radiation in the dielectric protective layer in two orthogonal directions that both are transverse to the direction of propagation of the optical radiation. The elongated structure can be formed in the dielectric protective layer by for example a process sequence involving a lithographic step followed by one of a wet developing step, a wet etching step and a dry etching step. The elongated structure provides the dielectric protective layer with a nonplanar optical waveguide that can be referred to as a rib waveguide.

In an embodiment of the environmentally protected photonic integrated circuit according to the invention, the nonplanar dielectric optical waveguide comprises a second surface that is arranged to face away from the first surface of the InP-based substrate, said second surface being provided with a recess that is configured and arranged to at least partially couple the second portion of the optical mode of the optical radiation out of the nonplanar dielectric optical waveguide in a direction facing away from the first surface of the InP-based substrate. In this way, a so-called vertical or transverse power tap can be provided that can for example be used for at least one of monitoring and testing purposes.

In an embodiment of the environmentally protected photonic integrated circuit according to the invention, wherein in at least a part of said photonic integrated circuit the nonplanar InP-based optical waveguide and the nonplanar dielectric optical waveguide of the multilevel optical waveguide assembly are arranged with respect to each other to enable guidance of the first portion of the optical mode of the optical radiation that is present in the nonplanar InP-based optical waveguide and the second portion of the optical mode of the optical radiation that is present in the nonplanar dielectric optical waveguide in different lateral directions across said photonic integrated circuit. In this way, a so-called horizontal or lateral power tap can be provided that enables optical radiation to be guided to different parts of the PIC where for example at least one of monitoring and testing can be done.

In an embodiment of the environmentally protected photonic integrated circuit according to the invention, said second surface of the nonplanar dielectric optical waveguide is at least partially provided with a metal contact pad. By configuring the metal contact pad as a heater, thermo-optic manipulation of the second portion of the optical mode of the optical radiation that is present in the nonplanar dielectric optical waveguide can be achieved through the thermo-optic coefficient of the dielectric material. The person skilled in the art will appreciate that the thermo-optic coefficient of dielectric layers can be used to enable at least one of low-speed switching, modulation and attenuation of optical functions. Moreover, in this way a variable in-plane power tap can be established. The metal contact pad can be covered by a further dielectric protective layer to protect the metal contact pad against environmental contaminants. In order to establish an electrical connection with the metal contact pad, the further dielectric protective layer can be provided with at least one opening that allows access to the metal contact pad.

In an embodiment of the environmentally protected photonic integrated circuit according to the invention, the dielectric protective layer is a polymer-based layer that comprises one of a polyacrylate, a polycarbonate, a polyimide, a polyurethane, a polyxylylene, a benzocyclobutene, a polysiloxane, and silicon. Any one of the aforementioned types of polymer-based protective layers can be applied to a full wafer comprising a plurality of PICs by one of spin coating, dip coating, screen printing, and vapor deposition. Alternatively, the polymer-based protective layer can be applied to a singulated PIC that is obtained through dicing of the full wafer, by one of dip coating, screen printing, dispensing, and vapor deposition. The person skilled in the art will appreciate that in the cases that the polymer-based protective layer is applied as a liquid phase, following its application, the polymer-based protective layer is cured or crosslinked by exposing it to a thermal treatment and/or a ultraviolet (UV) treatment in vacuum or in a specific atmosphere including at least one of oxygen ($O_2$), argon (Ar) and nitrogen ($N_2$). As a result of the curing, a toughened or hardened polymer-based protective layer is obtained that is suitable for providing protection to the PIC against environmental contaminants such as for example dust particles and moisture.

The person skilled in the art will appreciate that halogenation of the polymer-based protective layer may be applied to tailor the window of transparency of the polymer-based protective layer to telecommunication wavelengths, i.e. wavelengths in the range from 1300 nm to 1600 nm.

In an embodiment of the environmentally protected photonic integrated circuit according to the invention, the dielectric protective layer is provided with at least two different refractive indices. In case that the dielectric protective layer is a polymer-based layer, the at least two different refractive indices can for example be provided by selective exposure of suitable regions of the polymer-based protective layer to UV radiation. The required wavelength of the UV radiation depends on at least one of the specific compositions of the polymer-based protective layer and the refractive index required. In this way, it is possible to establish a nonplanar polymer-based optical waveguide in an otherwise planar polymer-based protective layer thereby enabling optical confinement in the two orthogonal directions that both are transverse to the direction of propagation of the optical radiation present in the waveguide.

Alternatively, the at least two different refractive indices can be provided by applying the polymer-based protective layer as a stack of different polymer-based layers, wherein each polymer-based layer has a different refractive index. In this way, the nonplanar polymer-based optical waveguide can be configured as a ridge waveguide instead of a rib waveguide.

In an embodiment of the environmentally protected photonic integrated circuit according to the invention, the dielectric protective layer comprises at least one of an organic additive and an inorganic additive. By including at least one of said additives, which for example may be a filler, a getter or a stabilizer, at least one of environmental protection, mechanical stability, chemical stability, and optical functionality of the dielectric protective layer can be enhanced. In particular the environmental protection offered by the dielectric protective layer may further be improved by enhancing its capability of inhibiting chemical reactions or by enhancing its hydrophobicity against moisture. In case the dielectric protective layer is a polymer-based layer, its hydrophobicity can be enhanced by applying thin layers of halogenated polymers or polyp-xylylenes) by atomic layer deposition or molecular vapor deposition.

In an embodiment of the environmentally protected photonic integrated circuit according to the invention, the dielectric protective layer comprises a third surface that is arranged to face away from the first surface of the InP-based substrate, the dielectric protective layer being provided with indentations that are arranged to provide a regular pattern of protrusions at the third surface. In this way, the hydrophobicity of the dielectric protective layer can be enhanced in a different way than the above-mentioned way of applying thin layers of halogenated polymers or poly(p-xylylenes).

The application of the regular pattern of protrusions can provide the third surface of the dielectric protective layer with a contact angle of at least 50°. The person skilled in the art will appreciate that the contact angle is the angle, conventionally measured through a liquid, where a liquid-vapor interface meets a solid surface. The contact angle quantifies the wettability of a solid surface by a liquid via the Young equation. A given system of solid, liquid, and vapor at a given temperature and pressure has a unique equilibrium contact angle. However, in practice a dynamic phenomenon of contact angle hysteresis is often observed, ranging from the advancing or maximal contact angle to the receding or minimal contact angle. Values for the equilibrium contact angle range between the values for the advancing and receding contact angles and can be calculated from them.

The equilibrium contact angle reflects the relative strength of the liquid, solid, and vapor molecular interaction.

Furthermore, the person skilled in the art will appreciate that the contact angle can be measured by different methods including the static sessile drop method. Using the latter measurement method, the contact angle is measured by a contact angle goniometer using an optical subsystem to capture a profile of a pure liquid on a solid substrate. The angle formed between the liquid-solid interface and the liquid-vapor interface is the contact angle. For example, a polymer-based surface having a contact angle of at least 50° is considered to be hydrophobic, whereas a hydrophilic polymer-based surface has a contact angle that is smaller than 50°. For example, in the case of polyethylene or polypropylene films, the person skilled in the art will be familiar with the ASTM D2578-17 standard test method for determining the contact angle. This test method is equivalent to ISO8296.

In an embodiment of the environmentally protected photonic integrated circuit according to the invention, the photonic integrated circuit is provided with one of a non-hermetic package and a hermetic package. The environmental protection and consequently the life-time of the PIC can be improved by including the PIC in a non-hermetic package. The person skilled in the art will appreciate that the environmental protection and therefore the life-time of the PIC can be improved even further by including the PIC in a hermetic package.

According to another aspect of the present invention, an opto-electronic system is provided comprising an environmentally protected photonic integrated circuit according to the invention. The opto-electronic system can for example but not exclusively be used for telecommunication applications. In that case, the opto-electronic systems can be one of a transmitter, a receiver, a transceiver, a coherent transmitter, a coherent receiver and a coherent transceiver. Based on the above, it will be clear that because of the application of the environmentally protected PIC according to the invention, the costs for the opto-electronic system can be reduced.

Further features and advantages of the invention will become apparent from the description of exemplary and non-limiting embodiments of an environmentally protected photonic integrated circuit (PIC) according to the present invention and of an opto-electronic system comprising such a PIC.

The person skilled in the art will appreciate that the described embodiments of the PIC and the opto-electronic system are exemplary in nature only and not to be construed as limiting the scope of protection in any way. The person skilled in the art will realize that alternatives and equivalent embodiments of the PIC and the opto-electronic system can be conceived and reduced to practice without departing from the scope of protection of the present invention.

BRIEF DESCRIPTION OF THE DRAWINGS

Reference will be made to the figures on the accompanying drawing sheets. The figures are schematic in nature and therefore not necessarily drawn to scale. Furthermore, equal reference numerals denote equal or similar parts. On the attached drawing sheets.

FIG. 6C shows a schematic cross-section of a part of a ninth exemplary, non-limiting embodiment of an environmentally protected PIC according to the present invention comprising a polymer-based ridge waveguide that is obtained by combining the techniques that have resulted in the embodiments of the PIC that are shown in FIGS. 6A and 6B;

DETAILED DESCRIPTION OF EMBODIMENTS

It is noted that although the presented exemplary, non-limiting embodiments of the environmentally protected PIC 1 according to the present invention involve one polymer-based protective layer, the person skilled in the art will be able to envisage without undue burden embodiments involving more than one polymer-based protective layer and embodiments involving one or more non-polymer-based protective layers, for example silicon-containing layers such as silicon nitride or silicon oxynitride layers, falling within the scope of the present invention.

Figure 1B:
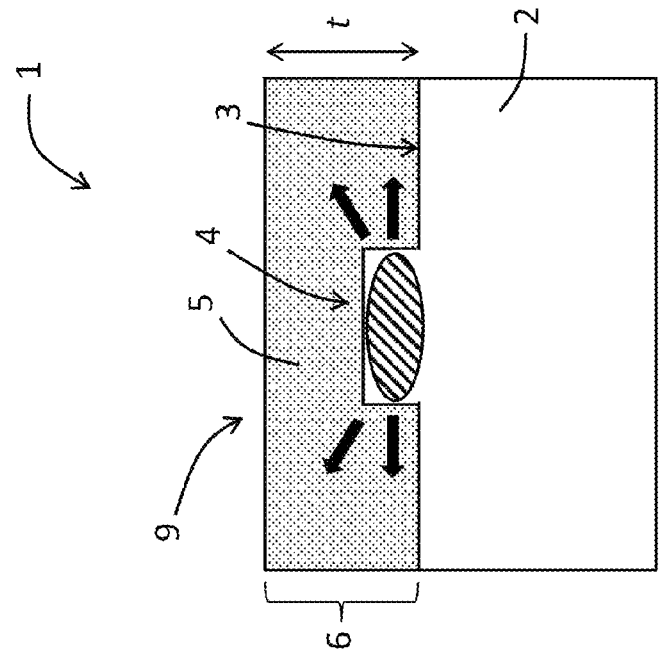
FIG. 1B shows a schematic cross-section along IB-IB of the first exemplary, non-limiting embodiment of the environmentally protected PIC that is shown in FIG. 1A.
Figure 1A:
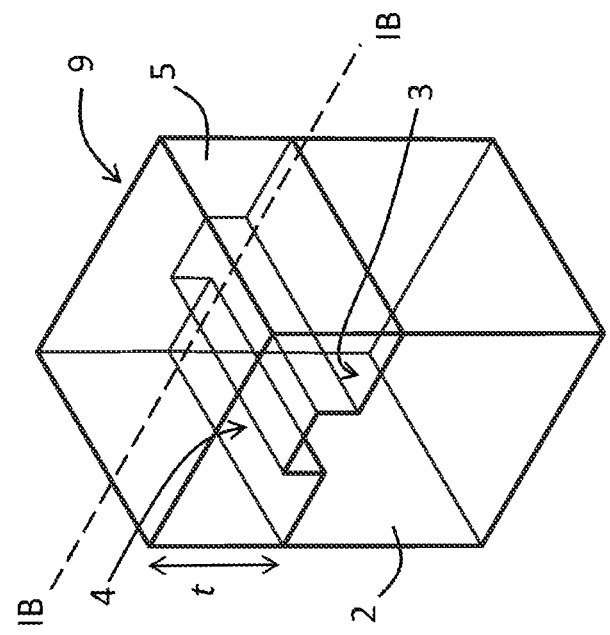
FIG. 1A shows a schematic isometric view of a part of a first exemplary, non-limiting embodiment of an environmentally protected photonic integrated circuit (PIC) according to the present invention in which a nonplanar InP-based optical waveguide is covered by a planar polymer-based protective layer.

FIG. 1A shows a schematic isometric view of a part of a first exemplary, non-limiting embodiment of an environmentally protected photonic integrated circuit (PIC) 1 according to the present invention. The PIC 1 comprises an InP-based substrate 2 that has a first surface 3 that is provided with a nonplanar InP-based optical waveguide 4 that is configured to guide optical radiation having a wavelength in a range from for example 1300 nm to 1600 nm. The PIC 1 also comprises a polymer-based protective layer 5 that covers the first surface 3 of the InP-based substrate 2 and the nonplanar InP-based optical waveguide 4. The polymer-based protective layer 5 can have a thickness t between 0.5 µm and 100 µm, preferably between 0.5 µm and 10 µm. Such a thickness can be sufficient to limit diffusion of environmental contaminants such as for example dust particles and moisture thereby enabling non-hermetic packaging of the PIC 1.

The polymer-based protective layer 5 shown in FIG. 1A is a so-called planarizing coating that provides the multilevel optical waveguide assembly 6 with a planar polymer-based optical waveguide 9. A planar polymer-based optical waveguide 9 having a thickness t in the above-mentioned range, provides confinement of optical radiation in only one orthogonal direction transverse to the direction of propagation of the optical radiation. It will be appreciated that in the PIC 1 shown in FIG. 1A, the direction in which the optical radiation is confined in the planar polymer-based optical waveguide 9 is transverse to the first surface 3 of the InP-based substrate 2.

FIG. 1B shows a schematic cross-section along 1B-1B of the first exemplary, non-limiting embodiment of the PIC 1 that is shown in FIG. 1A. The nonplanar InP-based optical waveguide 4 and the polymer-based protective layer 5 provide the PIC 1 with a multilevel optical waveguide assembly 6. The polymer-based protective layer 5 of the multilevel optical waveguide assembly 6 can for example carry a portion of the optical mode field of optical radiation present in the nonplanar InP-based optical waveguide 4. The optical mode field of the radiation present in the nonplanar InP-based optical waveguide is schematically indicated by the elliptical shape shown in FIG. 1B. Expansion of the optical mode field of the optical radiation into the polymer-based protective layer 5 is schematically indicated by the four fat arrows. The expansion of the optical mode field of the optical radiation into the polymer-based protective layer 5 can enable low-loss optical coupling between the PIC 1 and a standard optical fiber (not shown).

Figure 2B:
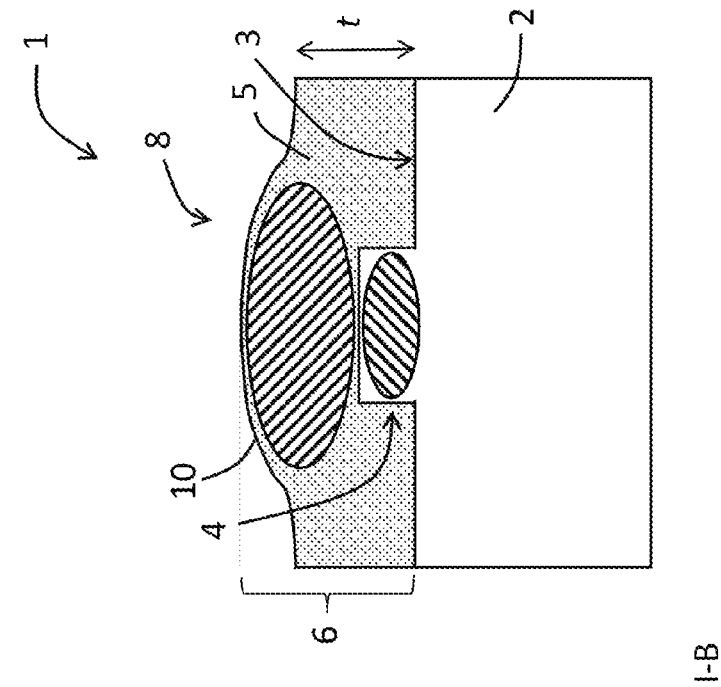
FIG. 2B shows a schematic cross-section along IIB-IIB of the second exemplary, non-limiting embodiment of the environmentally protected PIC that is shown in FIG. 2A.
Figure 2A:
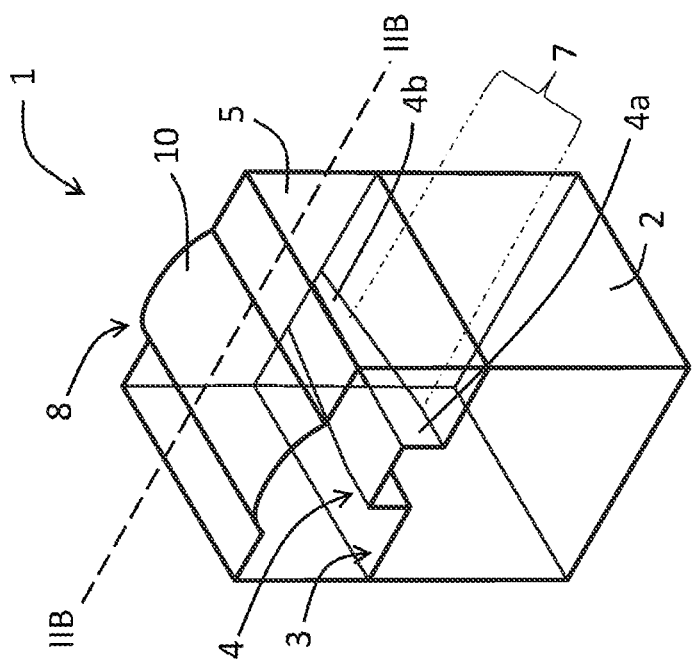
FIG. 2A shows a schematic isometric view of a part of a second exemplary, non-limiting embodiment of an environmentally protected PIC according to the present invention in which a nonplanar InP-based optical waveguide comprising a tapered section is covered by a conformal polymer-based protective layer.

FIG. 2A shows a schematic isometric view of a part of a second exemplary, non-limiting embodiment of an environmentally protected PIC 1 according to the present invention. The nonplanar InP-based optical waveguide 4 has a dimension in a direction transverse to the first surface 3 of the InP-based substrate 2. This dimension is generally referred to as the height of the waveguide 4. The waveguide 4 has a first height in a first part 4a of the waveguide 4 and a second height in a second part 4b of the waveguide 4. In the exemplary, non-limiting embodiment of the PIC 1 shown in FIG. 2A the first part 4a and the second part 4b have constant heights. The person skilled in the art will appreciate that the first part 4a and the second part 4b can have any suitable height profile required for the functionality of the PIC, i.e. the height can change monotonously or stepwise. In the PIC 1 shown in FIG. 2A, the first height is larger than the second height. The waveguide 4 is provided with a tapered section 7 that interconnects the first part 4a and the second part 4b in such a way that the optical mode field of the optical radiation upon passing the tapered section 7 from the first part 4a to the second part 4b is partially pushed out of the nonplanar InP-based optical waveguide 4 into the polymer-based protective layer 5. In this way, the optical mode filed of the optical radiation that is present in the nonplanar InP-based optical waveguide 4 is divided in a first portion that remains in the waveguide 4 and a second portion of the optical mode field that is pushed into the waveguide of the multilevel optical waveguide assembly 6 provided by the polymer-based protective layer 5.

FIG. 2B shows a schematic cross-section along IIB-IIB of the second exemplary, non-limiting embodiment of the PIC 1 that is shown in FIG. 2A. The first portion of the optical mode field that remains in the nonplanar InP-based optical waveguide 4 is schematically indicated in FIG. 2B as the smaller elliptical shape whereas the second portion of the optical mode field that is present in the polymer-based protective layer 5 is schematically indicated as the larger elliptical shape. The second portion of the optical mode field of the optical radiation that is present in the polymer-based protective layer 5 is at least 0.5% of the optical mode field of the optical radiation. In this way, the optical radiation in the polymer-based protective layer 5 is sufficient for at least one of the above-mentioned additional optical functionalities such as for example monitoring and testing purposes.

FIGS. 2A and 2B show that in accordance with the second exemplary, non-limiting embodiment of the PIC 1, the polymer-based protective layer 5 is a conformal coating that provides the multilevel optical waveguide assembly 6 with a nonplanar polymer-based optical waveguide 8 that is configured to allow confinement of the second portion of the optical mode of the optical radiation in the polymer-based protective layer 5 in two orthogonal directions that both are transverse to the direction of propagation of the optical radiation.

Figure 3B:
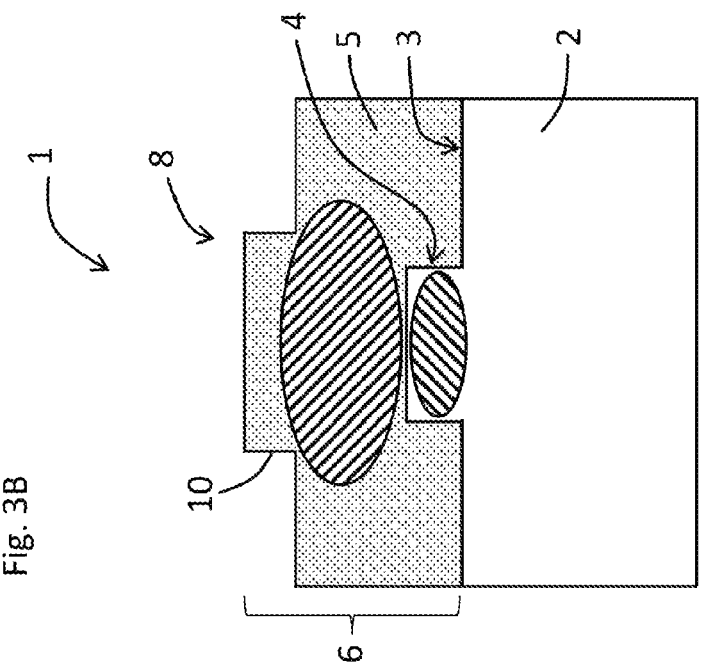
FIG. 3B shows a schematic cross-section along IIIB-IIIB of the third exemplary, non-limiting embodiment of the environmentally protected PIC that is shown in FIG. 3A.
Figure 3A:
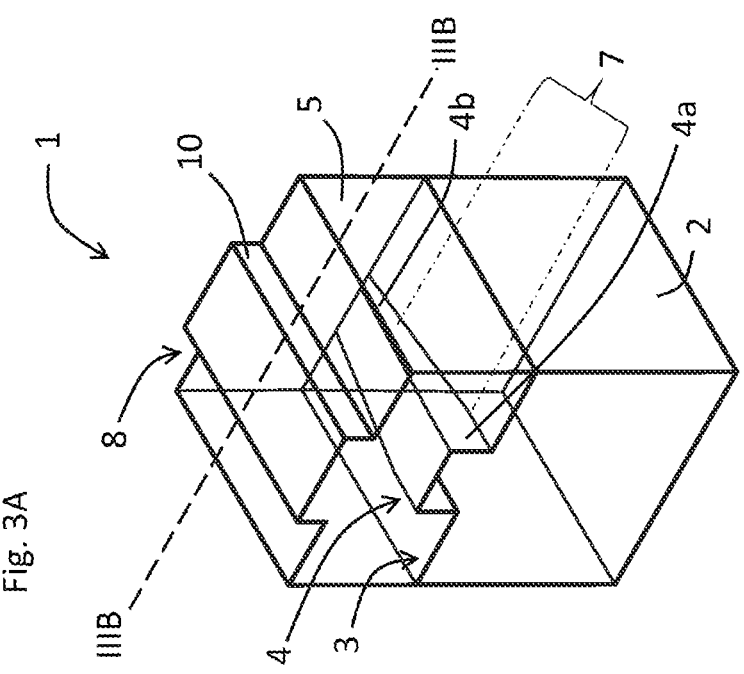
FIG. 3A shows a schematic isometric view of a part of a third exemplary, non-limiting embodiment of an environmentally protected PIC according to the present invention in which a nonplanar InP-based optical waveguide comprising a tapered section is covered by a polymer-based protective layer that is provided with an elongated structure thereby establishing a polymer-based rib waveguide.

FIG. 3A shows a schematic isometric view of a part of a third exemplary, non-limiting embodiment of an environmentally protected PIC 1 according to the present invention. The nonplanar InP-based optical waveguide 4 that comprises the tapered section 7 is covered by a polymer-based protective layer 5 that is applied as a planarizing coating. The polymer-based protective layer 5 comprises an elongated structure 10 that protrudes in a direction facing away from the first surface 3 of the InP-based substrate 2 and extends across the polymer-based protective layer 5 thereby providing the multilevel optical waveguide assembly 6 with a nonplanar polymer-based optical waveguide 8 that can also be referred to as a polymer-based optical rib waveguide. By providing a nonplanar polymer-based optical waveguide 8, the second portion of the optical mode of the optical radiation in the polymer-based protective layer 5 is confined in two orthogonal directions that both are transverse to the direction of propagation of the optical radiation. The elongated structure 10 can be formed in the polymer-based protective layer 5 by for example a process sequence involving a lithographic step followed by one of a wet developing step, a wet etching step and a dry etching step.

FIG. 3B shows a schematic cross-section along IIIB-IIIB of the third exemplary, non-limiting embodiment of the environmentally protected PIC that is shown in FIG. 3A. The first portion of the optical mode field that remains in the nonplanar InP-based optical waveguide 4 is schematically indicated as the smaller elliptical shape whereas the second portion of the optical mode field that is present in the polymer-based protective layer 5 is schematically indicated as the larger elliptical shape.

Figure 4B:
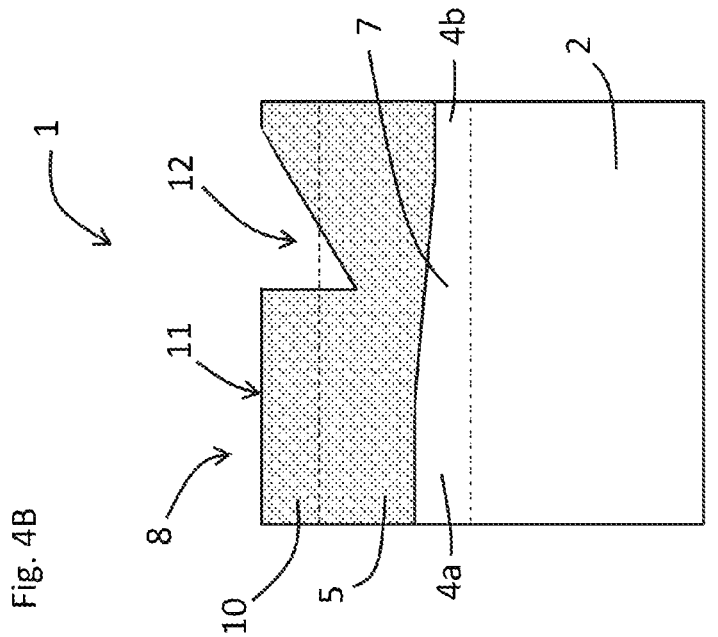
FIG. 4B shows a schematic cross-section along IVB-IVB of the fourth exemplary, non-limiting embodiment of the environmentally protected PIC that is shown in FIG. 4A.
Figure 4A:
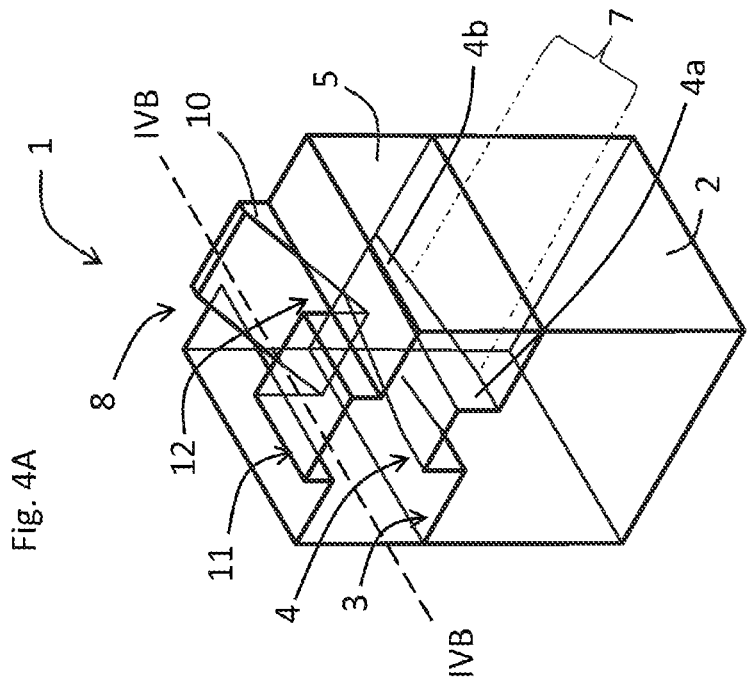
FIG. 4A shows a schematic isometric view of a part of a fourth exemplary, non-limiting embodiment of an environmentally protected PIC according to the present invention in which a nonplanar InP-based optical waveguide comprising a tapered section is covered by a polymer-based protective layer that is provided with an elongated structure that is provided with a recess.

FIG. 4A shows a schematic isometric view of a part of a fourth exemplary, non-limiting embodiment of an environmentally protected PIC 1 according to the present invention in which the nonplanar polymer-based optical waveguide 8 comprises a second surface 11 that is arranged to face away from the first surface 3 of the InP-based substrate 2. The second surface 11 is provided with a recess 12 that is configured and arranged to at least partially couple the second portion of the optical mode of the optical radiation out of the nonplanar polymer-based optical waveguide 8 in a direction facing away from the first surface 3 of the InP-based substrate 2. In this way, a so-called vertical or transverse power tap can be provided that can for example be used for at least one of monitoring and testing purposes.

FIG. 4B shows a schematic cross-section along IVB-IVB of the fourth exemplary, non-limiting embodiment of the PIC 1 that is shown in FIG. 4A. The recess 12 extends down into the polymer-based protective layer 5 to a larger extent than the height of the elongated structure 10. The recess 12 has a sloped sidewall that enables the second portion of the optical mode of the optical radiation to be coupled out of the nonplanar polymer-based optical waveguide 8 in the direction facing away from the first surface 3 of the InP-based substrate 2.

Figure 5A:
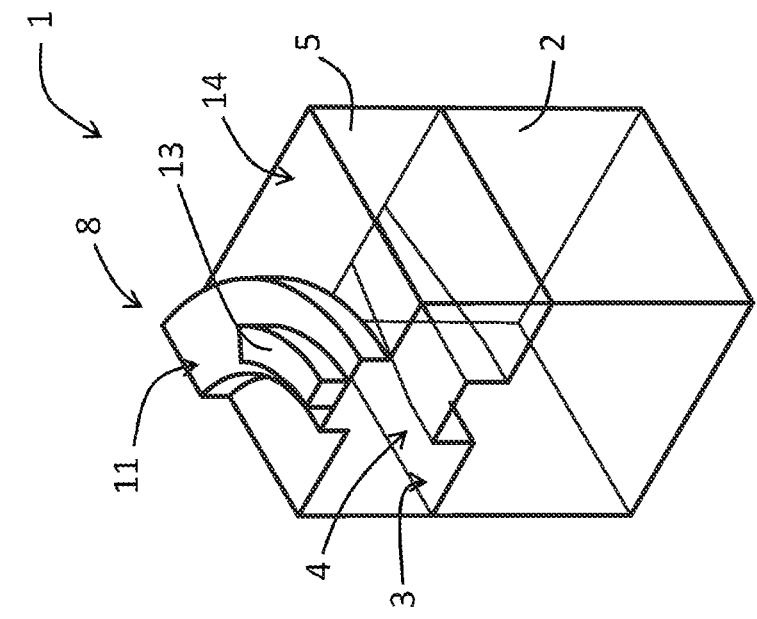
FIG. 5A shows a schematic isometric view of a part of a fifth exemplary, non-limiting embodiment of an environmentally protected PIC according to the present invention in which a nonplanar InP-based optical waveguide comprising a tapered section is covered by a polymer-based protective layer that is provided with an elongated structure that is arranged to direct optical radiation in a different lateral direction across the PIC.

FIG. 5A shows a schematic isometric view of a part of a fifth exemplary, non-limiting embodiment of an environmentally protected PIC 1 according to the present invention in which the nonplanar InP-based optical waveguide 4 and the nonplanar polymer-based optical waveguide 8 of the multilevel optical waveguide assembly are arranged with respect to each other to enable guidance of the first portion of the optical mode of the optical radiation that is present in the nonplanar InP-based optical waveguide 4 and the second portion of the optical mode of the optical radiation that is present in the nonplanar polymer-based optical waveguide 8 in different lateral directions across the PIC 1. In this way, a so-called horizontal or lateral power tap can be provided that enables optical radiation to be guided to different parts of the PIC 1 where for example at least one of monitoring and testing can be done.

Figure 5B:
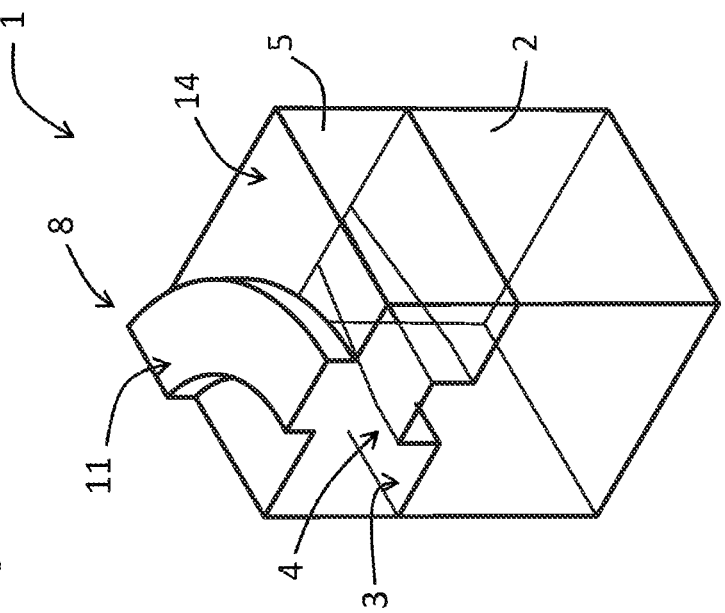
FIG. 5B shows a schematic isometric view of a part of a sixth exemplary, non-limiting embodiment of an environmentally protected PIC according to the present invention in which a nonplanar InP-based optical waveguide comprising a tapered section is covered by a polymer-based protective layer that is provided with an elongated structure that is provided with a metal contact pad.

FIG. 5B shows a schematic isometric view of a part of a sixth exemplary, non-limiting embodiment of an environmentally protected PIC 1 according to the present invention in which the second surface 11 of the nonplanar polymer-based optical waveguide 8 is provided with a metal contact pad 13. By configuring the metal contact pad 13 as a heater, thermo-optic manipulation of the second portion of the optical mode of the optical radiation that is present in the nonplanar polymer-based optical waveguide 8 can be achieved through the thermo-optic coefficient of the polymer-based material. The person skilled in the art will appreciate that the thermo-optic coefficient of polymer-based layers can be used to enable at least one of low-speed switching, modulation and attenuation of optical functions. Moreover, in this way a variable in-plane power tap can be established.

Figure 6A:
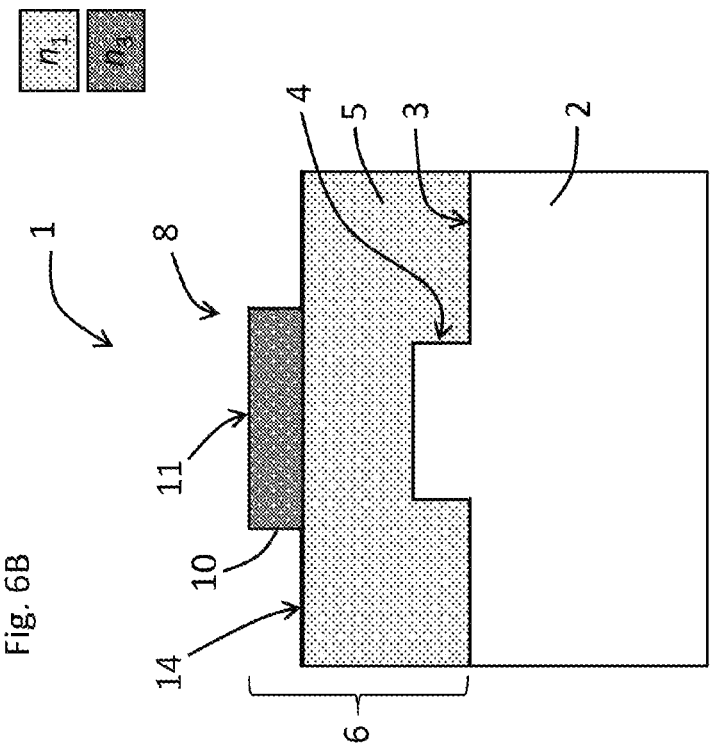
FIG. 6A shows a schematic cross-section of a part of a seventh exemplary, non-limiting embodiment of an environmentally protected PIC according to the present invention in which regions of the polymer-based protective layer have been selectively exposed to UV radiation to create regions of lower refractive index thereby providing a polymer-based rib waveguide.

FIG. 6A shows a schematic cross-section of a part of a seventh exemplary, non-limiting embodiment of an environmentally protected PIC 1 according to the present invention in which the polymer-based protective layer 5 is provided with two different refractive indices $n_1$, $n_2$ wherein $n_1 > n_2$. The refractive index $n_2$ is established by selective exposure of a third surface 14 of the polymer-based protective layer 5 to UV radiation. The required wavelength of the UV radiation depends on at least one of the specific compositions of the polymer-based protective layer 5 and the refractive index required. As discussed above, in this way it is possible to establish a nonplanar polymer-based optical waveguide 8 in an otherwise planar polymer-based protective layer 5 thereby enabling optical confinement in the two orthogonal directions that both are transverse to the direction of propagation of the optical radiation present in the waveguide.

Figure 6B:
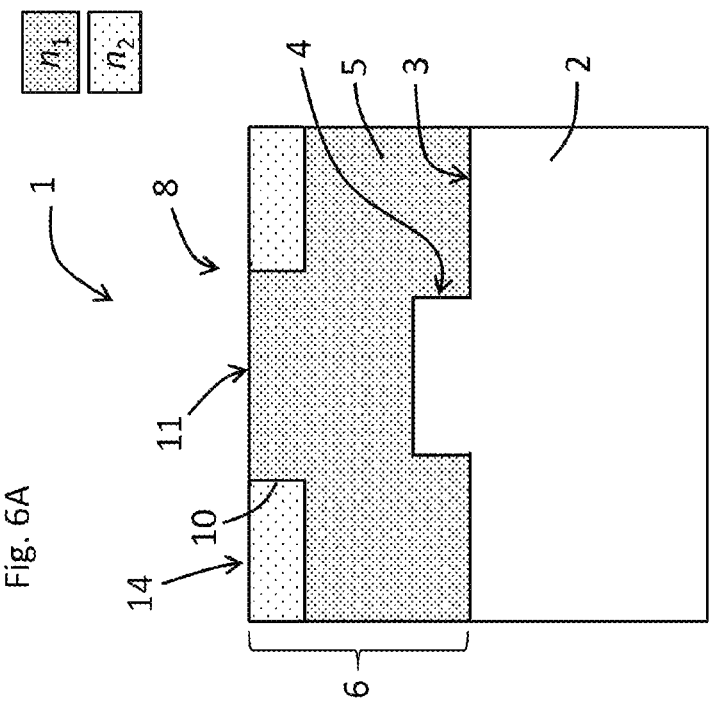
FIG. 6B shows a schematic cross-section of a part of an eighth exemplary, non-limiting embodiment of an environmentally protected PIC according to the present invention in which a stack of two polymer-based layers is provided each polymer-based layer having a different refractive index, wherein the top polymer-based layer has partially been removed thereby providing a polymer-based ridge waveguide.

FIG. 6B shows a schematic cross-section of a part of an eighth exemplary, non-limiting embodiment of an environmentally protected PIC 1 according to the present invention in which the two different refractive indices $n_1$, $n_3$ wherein $n_3 > n_1$ are provided by applying a stack of two different polymer-based protective layers. The first layer that is in contact with the first surface 3 of the InP-based substrate 2 has refractive index $n_1$, whereas the second layer that is covering the first layer has refractive index $n_3$. By partially removing the second polymer-based layer, an elongated structure 10 is provided. In this way, the nonplanar polymer-based optical waveguide 8 is provided that can be referred to as a ridge waveguide instead of a rib waveguide because the first polymer-based layer and the second polymer-based layer have a different refractive index, wherein the refractive index of the second polymer-based layer is higher than the refractive index of the first polymer-based layer, i.e. $n_3 > n_1$. The parts of the second polymer-based layer can be removed by the above-mentioned process sequence involving a lithographic step followed by one of a wet developing step, a wet etching step and a dry etching step.

FIG. 6C shows a schematic cross-section of a part of a ninth exemplary, non-limiting embodiment of an environmentally protected PIC 1 according to the present invention comprising a nonplanar polymer-based waveguide that is obtained by combining the techniques that were used for establishing the nonplanar polymer-based optical waveguides shown in FIGS. 6A and 6B. The PIC 1 shown in FIG. 6C comprises a stack of two different polymer-based protective layers of which the first layer is in contact with the first surface 3 of the InP-based substrate 2. The first layer has a refractive index $n_1$. The second layer covers the first layer and has a refractive index $n_3$, wherein $n_3>n_1$. The second layer is provided with a refractive index $n_2$, wherein $n_3>n_1>n_2$, by selective exposure of the third surface 14 of the polymer-based protective layer 5 to UV radiation. As mentioned above, the required wavelength of the UV radiation depends on at least one of the specific compositions of the second polymer-based protective layer and the refractive index required. As a result, a nonplanar polymer-based optical waveguide 8 in an otherwise planar stack of polymer-based protective layers is established thereby enabling optical confinement in the two orthogonal directions that both are transverse to the direction of propagation of the optical radiation present in the waveguide.

Figure 7B:
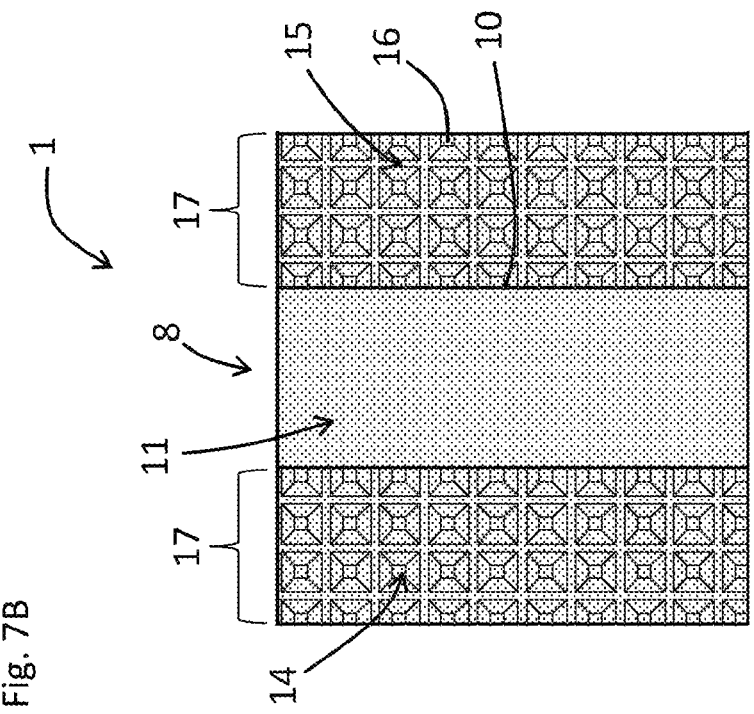
FIG. 7B shows a schematic top view of the part of the tenth exemplary, non-limiting embodiment of the environmentally protected PIC shown in FIG. 7A.
Figure 7A:
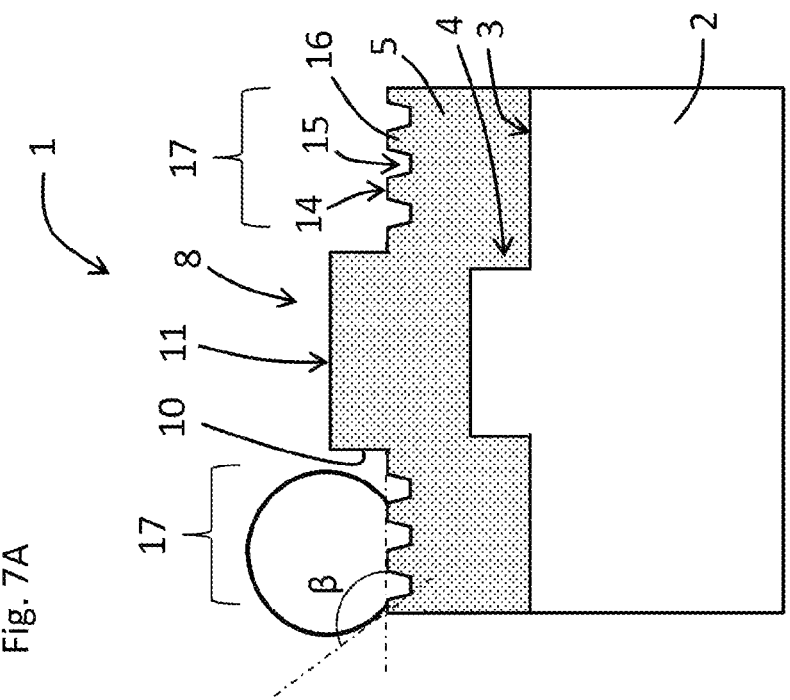
FIG. 7A shows a schematic cross-section of a part of a tenth exemplary, non-limiting embodiment of an environmentally protected PIC according to the present invention in which a surface of the polymer-based protective layer that is arranged to face away from the InP-based substrate is provided with indentations that are arranged to provide a regular pattern of protrusions.

FIG. 7A shows a schematic cross-section of a part of a tenth exemplary, non-limiting embodiment of an environmentally protected PIC 1 according to the present invention in which the third surface 14 of the polymer-based protective layer 5 is provided with indentations 15 that are arranged to provide a regular pattern 17 of protrusions 16 that extend in a direction facing away from the first surface 3 of the InP-based substrate 2. As a result of the regular pattern 17 of protrusions 16, the third surface 14 of the polymer-based protective layer 5 has an improved hydrophobicity. As shown in FIG. 7A, the contact angle β of the third surface 14 is larger than 90°. The person skilled in the art will appreciate that for example a polymer-based surface having a contact angle of at least 50° is considered to be hydrophobic, whereas a polymer-based surface that has a contact angle that is smaller than 50° is considered to be hydrophilic.

FIG. 7B shows a schematic top view of the part of the tenth exemplary, non-limiting embodiment of the PIC 1 shown in FIG. 7A. The regular patterns 17 of protrusions 16 that are arranged alongside the elongated structure 10 of the nonplanar polymer-based optical waveguide 8 can clearly be seen. Although not shown, the person skilled in the art will appreciate that depending on at least one of the specific functionality and the performance requirements of the PIC 1, the second surface 11 of the nonplanar polymer-based optical waveguide 8 can also be provided with a regular pattern of protrusions.

Figure 8:
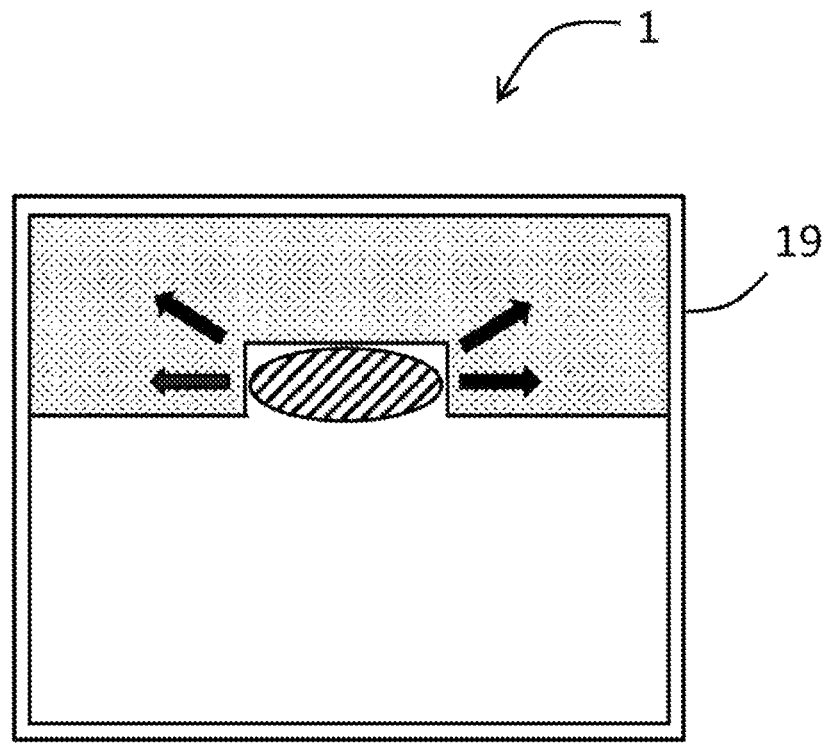
FIG. 8 shows a schematic cross-section of an eleventh exemplary, non-limiting embodiment of the environmentally protected PIC, wherein the PIC is provided with a hermetic package.

FIG. 8 shows a schematic cross-section of an eleventh exemplary, non-limiting embodiment of the environmentally protected PIC, wherein the PIC 1 is provided with a hermetic package 19. As mentioned above, the hermetic package 19 can improve the environmental protection and therefore the life-time of the PIC 1. The person skilled in the art will appreciate that the PIC can also be provided with a non-hermetic package (not shown). In the latter case, the environmental protection and consequently the life-time of the PIC can also be improved but to a lesser extent.

Figure 9:
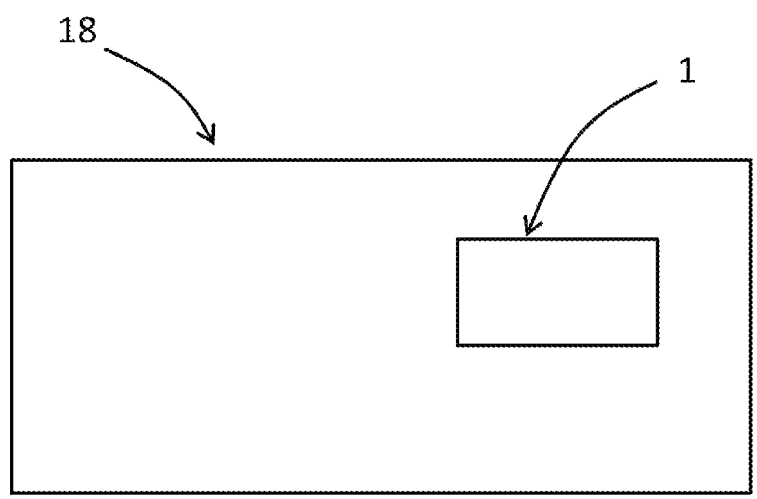
FIG. 9 shows a schematic view of a first exemplary, non-limiting embodiment of an opto-electronic system for telecommunication applications comprising an environmentally protected PIC according to the present invention.

FIG. 9 shows a schematic view of a first exemplary, non-limiting embodiment of an opto-electronic system 18 for telecommunication applications comprising an environmentally protected PIC 1 according to the present invention. The opto-electronic system 18 can for example be one of a transmitter, a receiver, a transceiver, a coherent transmitter, a coherent receiver and a coherent transceiver.

The present invention can be summarized as relating to an environmentally protected PIC 1, comprising an InP-based substrate 2 having a first surface 3 that is at least partially provided with an InP-based optical waveguide 4, and a dielectric protective layer 5 arranged to cover at least the first surface 3 of the InP-based substrate 2 and the InP-based optical waveguide 4. The dielectric protective layer 5 is configured to protect said PIC 1 from environmental contaminants, to enable confinement of optical radiation in the dielectric protective layer 5 in at least one direction that is transverse to a direction of propagation of the optical radiation, and to allow exchange of the optical radiation between the InP-based optical waveguide 4 and the dielectric protective layer 5.

The invention also relates to an opto-electronic system 18 comprising said PIC 1.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

REFERENCE NUMERALS 1 environmentally protected photonic integrated circuit (PIC)
2 indium phosphide-based (InP-based) substrate
3 first surface of the InP-based substrate
4 InP-based optical waveguide
4a first part of the InP-based optical waveguide
4b second part of the InP-based optical waveguide
5 dielectric protective layer
6 multilevel optical waveguide assembly
7 tapered section of the InP-based optical waveguide
8 nonplanar dielectric optical waveguide
9 planar dielectric optical waveguide
10 elongated structure
11 second surface of the nonplanar dielectric optical waveguide
12 recess
13 metal contact pad
14 third surface of the dielectric protective layer
β contact angle of the third surface of the dielectric protective layer
t thickness of the dielectric protective layer
$n_1$ first refractive index
$n_2$ second refractive index, $n_1>n_2$
$n_3$ third refractive index, $n_3>n_1>n_2$
15 indentation
16 protrusion
17 regular pattern of protrusions 18 opto-electronic system for telecommunication applications
19 hermetic package

The invention claimed is:

1. An environmentally protected photonic integrated circuit, comprising:
   an indium phosphide, InP, -based substrate having a first surface that is at least partially provided with an InP-based optical waveguide; and
   a dielectric protective layer that is arranged to cover at least the first surface of the InP-based substrate and the InP-based optical waveguide, the dielectric protective layer being configured to:
   protect said photonic integrated circuit from environmental contaminants;
   enable confinement of optical radiation in the dielectric protective layer in at least one direction that is transverse to a direction of propagation of the optical radiation; and
   allow exchange of the optical radiation between the InP-based optical waveguide and the dielectric protective layer;
   wherein the InP-based optical waveguide and the dielectric protective layer provide said photonic integrated circuit with a multilevel optical waveguide assembly,
   wherein the InP-based optical waveguide has a dimension in a direction transverse to the first surface of the InP-based substrate, said dimension having a first value in a first part of said waveguide and a second value in a second part of said waveguide, the second value being smaller than the first value, said waveguide comprising a tapered section that is configured and arranged to interconnect the first part of said waveguide and the second part of said waveguide thereby allowing an optical mode field of the optical radiation upon passing the tapered section from the first part to the second part to be divided in a first portion that is present in said waveguide and a second portion that is present in the dielectric protective layer, and
   wherein the InP-based optical waveguide is a nonplanar optical waveguide, and wherein the dielectric protective layer is a conformal coating that provides the multilevel optical waveguide assembly with a nonplanar dielectric optical waveguide that is configured to allow confinement of the second portion of the optical mode of the optical radiation in the dielectric protective layer in two orthogonal directions that both are transverse to the direction of propagation of the optical radiation.

2. The environmentally protected photonic integrated circuit according to claim 1, wherein the dielectric protective layer comprises an elongated structure that is arranged to protrude in a direction facing away from the first surface of the InP-based substrate and to extend across at least a part of the dielectric protective layer thereby providing the multilevel optical waveguide assembly with a nonplanar dielectric optical waveguide that is configured to allow confinement of the second portion of the optical mode of the optical radiation in the dielectric protective layer in two orthogonal directions that both are transverse to the direction of propagation of the optical radiation.

3. The environmentally protected photonic integrated circuit according to claim 1, wherein the nonplanar dielectric optical waveguide comprises a second surface that is arranged to face away from the first surface of the InP-based substrate, said second surface being provided with a recess that is configured and arranged to at least partially couple the second portion of the optical mode of the optical radiation out of the nonplanar dielectric optical waveguide in a direction facing away from the first surface of the InP-based substrate.

4. The environmentally protected photonic integrated circuit according to claim 2, wherein the nonplanar dielectric optical waveguide comprises a second surface that is arranged to face away from the first surface of the InP-based substrate, said second surface being provided with a recess that is configured and arranged to at least partially couple the second portion of the optical mode of the optical radiation out of the nonplanar dielectric optical waveguide in a direction facing away from the first surface of the InP-based substrate.

5. The environmentally protected photonic integrated circuit according to claim 1, wherein in at least a part of said photonic integrated circuit the nonplanar InP-based optical waveguide and the nonplanar dielectric optical waveguide of the multilevel optical waveguide assembly are arranged with respect to each other to enable guidance of the first portion of the optical mode of the optical radiation that is present in the nonplanar InP-based optical waveguide and the second portion of the optical mode of the optical radiation that is present in the nonplanar dielectric optical waveguide in different lateral directions across said photonic integrated circuit.

6. The environmentally protected photonic integrated circuit according to claim 2, wherein in at least a part of said photonic integrated circuit the nonplanar InP-based optical waveguide and the nonplanar dielectric optical waveguide of the multilevel optical waveguide assembly are arranged with respect to each other to enable guidance of the first portion of the optical mode of the optical radiation that is present in the nonplanar InP-based optical waveguide and the second portion of the optical mode of the optical radiation that is present in the nonplanar dielectric optical waveguide in different lateral directions across said photonic integrated circuit.

7. The environmentally protected photonic integrated circuit according to claim 3, wherein in at least a part of said photonic integrated circuit the nonplanar InP-based optical waveguide and the nonplanar dielectric optical waveguide of the multilevel optical waveguide assembly are arranged with respect to each other to enable guidance of the first portion of the optical mode of the optical radiation that is present in the nonplanar InP-based optical waveguide and the second portion of the optical mode of the optical radiation that is present in the nonplanar dielectric optical waveguide in different lateral directions across said photonic integrated circuit.

8. The environmentally protected photonic integrated circuit according to claim 3, wherein said second surface of the nonplanar dielectric optical waveguide is at least partially provided with a metal contact pad.

9. The environmentally protected photonic integrated circuit according to claim 1, wherein the dielectric protective layer is a polymer-based layer that comprises one of a polyacrylate, a polycarbonate, a polyimide, a polyurethane, a polyxylylene, a benzocyclobutene, a polysiloxane, and silicon.

10. The environmentally protected photonic integrated circuit according to claim 1, wherein the dielectric protective layer is provided with at least two different refractive indices.

11. The environmentally protected photonic integrated circuit according to claim 1, wherein the dielectric protective layer comprises at least one of an organic additive and an inorganic additive.

12. The environmentally protected photonic integrated circuit according to claim 1, wherein the dielectric protective layer comprises a third surface that is arranged to face away from the first surface of the InP-based substrate, the polymer-based protective layer being provided with indentations that are arranged to provide a regular pattern of protrusions at the third surface.

13. The environmentally protected photonic integrated circuit according to claim 1, wherein the photonic integrated circuit is provided with one of a non-hermetic package and a hermetic package.

14. An opto-electronic system comprising an environmentally protected photonic integrated circuit according to claim 1, wherein the opto-electronic system is one of a transmitter, a receiver, a transceiver, a coherent transmitter, a coherent receiver and a coherent transceiver.

15. The environmentally protected photonic integrated circuit according to claim 7, wherein said second surface of the nonplanar dielectric optical waveguide is at least partially provided with a metal contact pad.

* * * * *